United States Patent [19]

Kawamura et al.

[11] 4,147,412
[45] Apr. 3, 1979

[54] FIXTURE FOR MOUNTING BAR LENS ARRAY IN ELECTROPHOTOGRAPHIC APPARATUS

[75] Inventors: Atsushi Kawamura; Motoaki Kawazu, both of Tokyo, Japan

[73] Assignee: Ricoh Company, Ltd., Tokyo, Japan

[21] Appl. No.: 831,625

[22] Filed: Sep. 8, 1977

Related U.S. Application Data

[62] Division of Ser. No. 621,881, Oct. 14, 1975, Pat. No. 4,059,345.

[30] Foreign Application Priority Data

Oct. 17, 1974 [JP] Japan ............... 49-119692

[51] Int. Cl.² .................................................. G02B 7/02
[52] U.S. Cl. .......................................... 350/252; 355/1
[58] Field of Search ............ 350/96 EN, 252; 355/1, 355/8

[56] References Cited

U.S. PATENT DOCUMENTS

| | | | |
|---|---|---|---|
| 3,947,115 | 3/1976 | Hamaguchi | 355/1 X |
| 3,955,888 | 5/1976 | Kakiuchi et al. | 355/1 |
| 3,977,761 | 8/1976 | Kawazu et al. | 355/1 UX |
| 3,977,777 | 8/1976 | Tanaka et al. | 355/1 |

Primary Examiner—F. L. Evans
Attorney, Agent, or Firm—Frank J. Jordan

[57] ABSTRACT

A bar lens array is mounted between an original document and a photoconductive member in such a manner that the ends of the bar lenses are equally spaced from the document and photoconductive member regardless of manufacturing differences in the length of the bar lenses of the array. Reference marks may be provided at the center of the bar lens array and at a point halfway between the document and photoconductive member which are aligned with each other. The bar lens array may be mounted in a sleeve which compensates for the length of the bar lenses. In this embodiment, a stopper is provided at a fixed distance from one of the document or photoconductive member. The distance C from one end of the bar lens array to a point on the sleeve adapted to align with the stopper is $C=(D-L)/2-K$ where D is the distance between the document and the photoconductive member, L is the length of the bar lens array and K is the distance from the stopper to the one of the document or photoconductive member.

4 Claims, 5 Drawing Figures

FIXTURE FOR MOUNTING BAR LENS ARRAY IN ELECTROPHOTOGRAPHIC APPARATUS

This is a division of application Ser. No. 621,881, filed Oct. 14, 1975, now U.S. Pat. No. 4,059,345.

The present invention relates to a fixture for mounting a bar lens array in an electrophotographic apparatus.

It has become popular in the field of electrophotography to provide an imaging system for focussing an image of an original document onto a photoconductive drum or similar member of an electrostatic copying machine. A bar lens is a cylindrical rod formed in such a manner that the index of refraction thereof decreases parabolically from the center of the bar lens to the circumference. Such a bar lens is manufactured under the trademark of SELFOC, and the index of refraction thereof varies according to the following equation $$n(r) = n_0 (1 - \frac{ar^2}{2}) \qquad (1)$$

where n is the index of refraction, r is the radial distance from the axis of the bar lens, $n_0$ is the index of refraction at the axis of the bar lens and a is a constant. Light rays incident on one end of such a bar lens propagate down the bar lens in a sine wave path having a period of $2\pi/\sqrt{A}$ The magnification of the image formed is $$m = \frac{1}{n_0 \sqrt{a} L \sin(\sqrt{a} L) - \cos(\sqrt{a} L)} \qquad (2)$$

In order to form a non-inverted image having a magnification of unity, the following relations must be fulfilled $$Lo = Li = \frac{1}{n_0 \sqrt{a} \tan(\frac{\sqrt{a} L}{2})} \qquad (3)$$

and $$\frac{(2i-1)\pi}{\sqrt{a}} < L < \frac{2i\pi}{\sqrt{a}} \qquad (4)$$

where Lo is the distance from one end of the bar lens to the document, Li is the distance from the other end of the bar lens to the photoconductive member and i is an integer. This leans to the following relation $$D = 2Lo + L \qquad (5)$$

It is therefore clear that the bar lens array must have a suitable length for image formation and the ends of the bar lens array must be equally spaced from the respective document and photoconductive member. However, a problem is inherent in the actual production of the electrophotographic apparatus in that although the specifications for the bar lenses specify the distance between the document and the photoconductive member for image formation, various makers use different kinds of glass and the like so that the lengths of the bar lenses are not the same for all makers. A fixture has not been heretofore been proposed which makes it possible to accurately mount bar lenses in electrophotographic apparatus which makes it possible to compensate for the lengths of the bar lenses.

It is therefore an important object of the present invention to provide a fixture for mounting a bar lens array in an electrophotographic apparatus which makes it possible to compensate in a convenient manner for bar lenses of different lengths.

The above and other objects, features and advantages of the present invention will become clear from the following detailed description taken with the accompanying drawings, in which.

Figure 1:
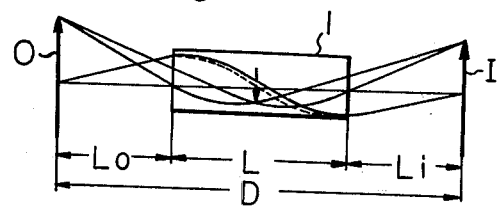
FIG. 1 is a diagram illustrating the geometry of a bar lens.

Referring now to FIG. 1, a bar lens 1 is disposed between an object plane O containing, for example, an original document (not shown) for electrostatic photography and an image plane I containing, for example, a photoconductive member such as a photoconductive drum (not shown). The distance from the object plane O to the left end (no numeral) of the bar lens 1 is Lo, the distance from the right end (no numeral) of the bar lens 1 to the image plane I is Li, the length of the bar lens 1 is L and the distance between the object plane O and the image plane I is D. The ray paths through the bar lens 1 are illustrated in FIG. 1.

Figure 2:
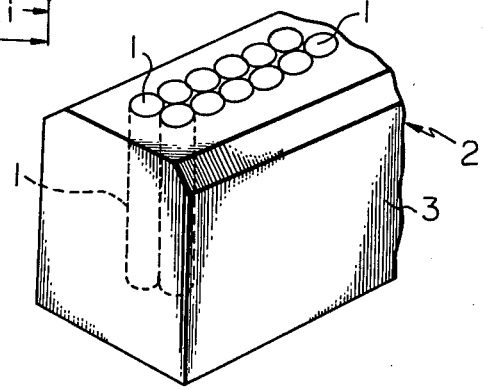
FIG. 2 is a fragmentary perspective view of a bar lens array.

Referring now to FIG. 2, a bar lens array 2 comprises a plurality of the bar lenses 1 arranged in rows and fixed relative to each other by a resin body 3. This array 2 allows the optical path in the electrostatic apparatus to be shortened relative to prior art apparatus and cuts down loss of light.

Figure 3:
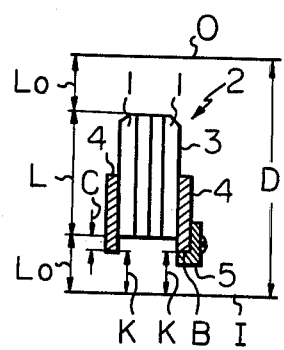
FIG. 3 is a sectional view of a first embodiment of the invention.

Referring now to FIG. 3, in accordance with the present invention a sleeve 4 is provided to the body 3 to fixedly hold the same. A stopper 5 is fixed in position between the planes O and I and has a stopper surface B spaced at a distance K from the image plane I. This stopper 5 may be provided in the same position regardless of the length of the bar lens 1.

The bottom end (in FIG. 3) of the sleeve 4 is adapted to abut against the stopper 5 and serves as an alignment point. The distance C from the lower end of the sleeve 4 to the lower end of the bar lenses 1 of the bar lens array 2 is $$C = (D - L)/2 - K \qquad (6)$$

The bar lens array 2 can thereby be inserted into the sleeve 4 so that the distance C is provided, and then the sleeve 4 can be inserted into the apparatus until the lower end thereof abuts against the stopper 5. The correct mounting of the bar lens array is thereby provided. It is necessary only to measure the length L of the lenses 1 assuming that the distance D between the planes O and I is known, and calculate the distance C using equation (6). The distance C can be easily provided using a micrometer, jig or the like (not shown).

The stopper 5 may be replaced by a screw or the like which performs the same function.

Figure 4:
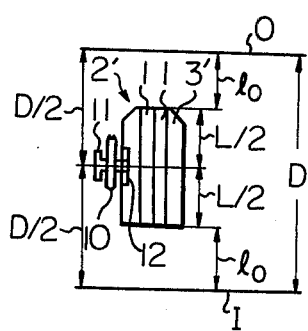
FIG. 4 is a sectional view of a second embodiment of the invention.

Another embodiment of the invention is shown in FIG. 4, in which a mount 10 is fixed between the planes O and I. A screw or pin 11 extends through a hole (no numeral) in the mount 10 so that the center of the pin 11 lies exactly halfway between the planes O and I. A hole 12 is provided at the center position of the body 3' of the array 2' halfway between the ends of the bar lenses 1. When the pin 11 enters the hole 12, the array 2' is correctly mounted between the planes O and I. The pin 11 and hole 12 may be replaced by alignment marks if desired.

Figure 5:
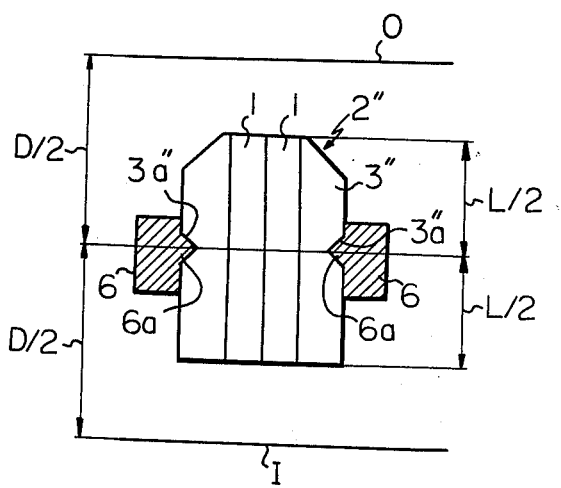
FIG. 5 is a sectional view of a third embodiment of the invention.

In FIG. 5, grooves 3a'' are formed in the opposite sides of the body 3'' of the array 2'' halfway between the ends of the bar lenses 1 thereof. A mount 6 is fixed in position between the planes O and I and is formed with projections 6a which are conjugate to the grooves 3a'' and lie halfway between the planes O and I. With the body 3'' of the array 2'' firmly held in position by the mount 6, the lenses 1 are correctly spaced from the planes O and I since the center of the array 2'' coincides with the halfway distance between the planes O and I. In the embodiment of FIG. 5, the grooves 3a'' and projection 6a are shown as V-shaped.

It will be seen that the present invention provides a high degree of utility in that bar lens arrays in which the bar lenses have different lengths can be used in a standardized electrophotographic apparatus. Many modifications within the scope of the invention will become clear to those skilled in the art after receiving the teachings of the present disclosure.

What is claimed is:

1. A fixture for mounting a bar lens in such a manner that ends of the bar lens are equally spaced from two respective planes, comprising first alignment means provided halfway between the ends of the bar lens, and second alignment means fixedly disposed halfway between the two planes, the first and second alignment means being arranged so that when the first and second alignment means are aligned, the ends of the bar lens are equally spaced from the two respective planes.

2. The fixture according to claim 1, in which the first alignment means comprises a first alignment marker provided halfway between the ends of the bar lens and the second alignment means comprises a second alignment marker provided halfway between the two planes.

3. The fixture according to claim 2, in which the first alignment marker comprises one of a groove and a conjugate protrusion and the second alignment marker comprises the other of the groove and the conjugate protrusion, the bar lens being fixedly held in position between the two planes by the groove and the conjugate protrusion.

4. The fixture according to claim 3, wherein said grooves and projections are V-shaped.